United States Patent
Lundin et al.

[19]

[11] Patent Number: 6,039,553
[45] Date of Patent: Mar. 21, 2000

[54] APPARATUS FOR MOLDING LIGHT EXTRACTION STRUCTURES ONTO A LIGHT GUIDE

[75] Inventors: David J. Lundin, Woodbury; Kevin M. Eliason, St. Paul, both of Minn.

[73] Assignee: 3M Innovative Properties Company, St, Paul, Minn.

[21] Appl. No.: 09/203,948

[22] Filed: Dec. 2, 1998

[51] Int. Cl.[7] .................................................. B29C 33/42
[52] U.S. Cl. .......................... 425/115; 425/122; 425/127; 425/470; 425/471; 264/1.24; 264/1.31; 264/1.6; 264/2.7
[58] Field of Search .................................. 264/1.24, 1.31, 264/1.32, 1.38, 1.6, 2.7; 425/115, 122, 174.4, 127, 470, 471

[56] References Cited

U.S. PATENT DOCUMENTS

| | | | |
|---|---|---|---|
| 3,196,196 | 7/1965 | Burbank | 425/122 |
| 4,873,030 | 10/1989 | Taketani et al. | 264/1.7 |
| 5,183,597 | 2/1993 | Lu | 264/1.4 |
| 5,225,166 | 7/1993 | Zarian et al. | 422/109 |
| 5,432,876 | 7/1995 | Appeldorn et al. | 385/31 |
| 5,534,101 | 7/1996 | Keyworth et al. | 264/1.24 |
| 5,538,674 | 7/1996 | Nisper et al. | 264/1.31 |
| 5,626,800 | 5/1997 | Williams et al. | 264/1.38 |
| 5,631,994 | 5/1997 | Appeldorn et al. | 385/147 |
| 5,659,643 | 8/1997 | Appeldorn et al. | 385/31 |
| 5,845,038 | 12/1998 | Lundin et al. | 385/901 |
| 5,905,826 | 5/1999 | Benson, Jr. et al. | 385/31 |
| 5,937,128 | 8/1999 | Robertson | 264/1.24 |

*Primary Examiner*—Robert Davis
*Assistant Examiner*—Thukhanh T. Nguyen
*Attorney, Agent, or Firm*—John A. Fortkort

[57] ABSTRACT

A method and apparatus for molding an illumination device using an open mold are provided which allow for the addition of light extraction structures to a prefabricated light guide using a curable material. A mold containing the extraction structures is first provided. Curable molding material and the prefabricated light guide are placed into the mold, and an overlay comprising light extraction structures is cured onto the light guide, providing a functional illumination device.

17 Claims, 2 Drawing Sheets

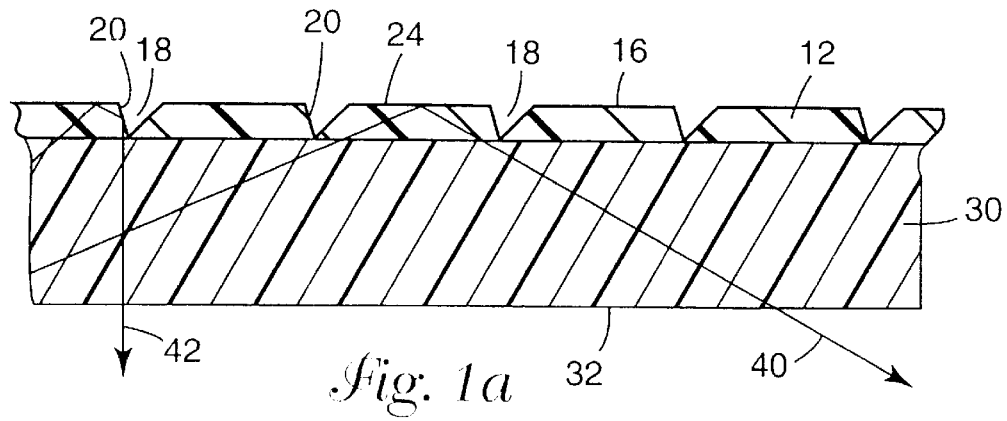
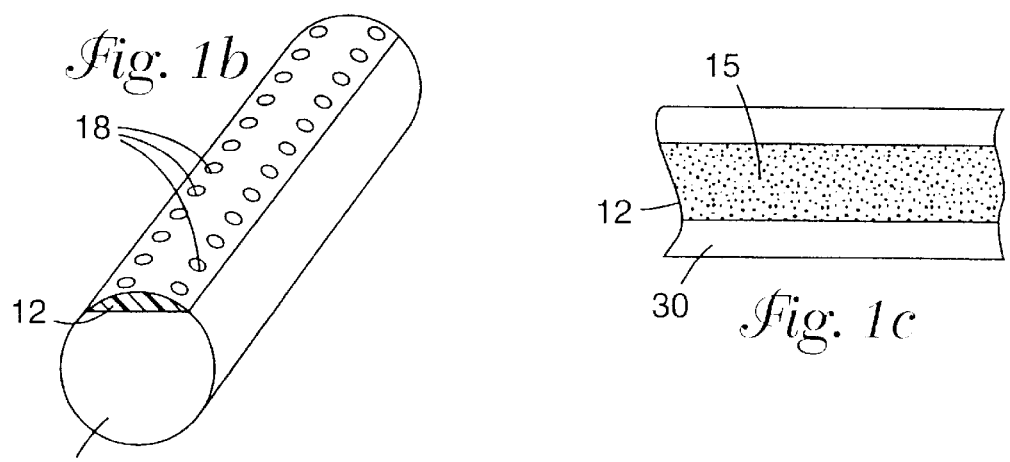
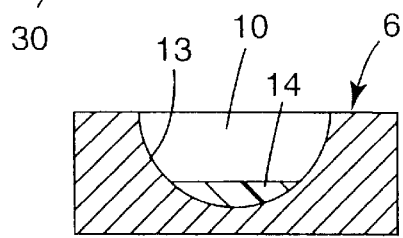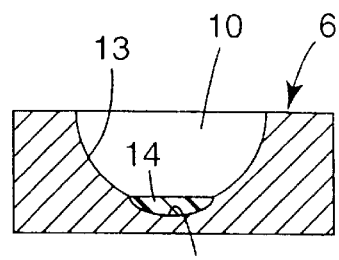
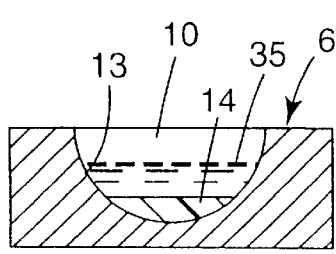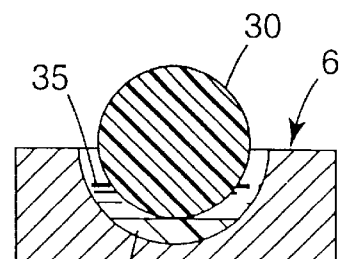

APPARATUS FOR MOLDING LIGHT EXTRACTION STRUCTURES ONTO A LIGHT GUIDE

FIELD OF THE INVENTION

The present invention relates generally to methods and apparatus for manufacturing an illumination device, and more particularly, to a method and apparatus for manufacturing an illumination device in which light extraction structures are molded in an overlay that is directly adhered to a light guide during the manufacturing process.

BACKGROUND OF THE INVENTION

Optically transmissive materials, such as glass or polymers, may be used as a light guide to propagate light. A light guide typically includes at least one surface adapted to receive light from a light source and an optically smooth surface for reflecting light propagating through the light guide. Common examples of light guides include the optical fibers traditionally used in the data communication industry, and the planar waveguides used in the optical display industry.

Light fibers are also used as components in illumination systems, as disclosed in, for example, U.S. Pat. No. 5,225,166 (Zarian et al.). In these systems, light is injected into at least one end of a light fiber and allowed to exit the fiber at a predetermined position or positions along the length of the fiber.

Methods for encouraging light to exit an optical fiber at a desired location are known as extraction techniques. Many extraction techniques cause light to leak from a light fiber in an uncontrolled fashion. Such techniques include subjecting the fiber to relatively sharp bends (generally known as "microbends") and removing and/or roughening a portion of the optical fiber core or cladding to provide a diffuse surface which causes light to escape.

Extraction techniques are also known which cause light to be extracted from an optical fiber in a controlled fashion. One such technique is disclosed in U.S. Pat. No. 5,432,876 (Appeldorn et al.). There, an illumination device is disclosed which has multiple light extraction structures or notches formed in the core of a light fiber. The extraction structures define first and second reflecting surfaces, which reflect in a radial direction a portion of the light propagating axially along or down the fiber. The reflected light is directed at an angle that is less than the critical angle necessary for continued propagation along the fiber, according to the principle of total internal reflection. As a result, the reflected light is extracted from the fiber.

Various methods of producing extraction structures are known. For example, the extraction structures may be directly micro-machined into the fiber itself. However, one of the drawbacks of this approach is that the materials which have desirable fiber properties (e.g., transparency, flexibility, and high refractive index) are often not amenable to precise micro-machining. Thus, it is very difficult, costly and time-consuming to directly machine features with a microscopic degree of precision and accuracy into the core materials of the fiber.

U.S. Pat. No. 5,631,994 (Appeldorn et al.) is directed toward another method of producing extraction structures. In accordance with this method, an overlay is provided that incorporates the extraction structures. The overlay, which is formed from an optically transparent substrate, is fabricated by conventional manufacturing processes, such as a molding process. An adhesive backing is applied to the overlay so that it can adhere to the fiber core. However, while this method overcomes some of the problems associated with alternative methods of imparting light extracting structures to a light guide, it also requires the presence of two extra interfaces, namely, the fiber/adhesive interface and the adhesive/substrate interface. Each of these additional interfaces can reduce the precision of light extraction, e.g., through undesirable scattering or reflection. Moreover, this method requires that the overlay be carefully aligned along the light guide. Furthermore, the use of an overlay limits the possible arrangement of extraction structures on the light guide. For example, it is difficult to arrange two or more parallel rows of extraction structures in which the structures are offset from one another.

U.S. application Ser. No. 09/026,836, entitled "Method and Apparatus for Seamless Microreplication Using an Expandable Mold," filed Feb. 20, 1998, discloses a method in which the fiber core and extraction structures are formed as an integral unit in a closed mold. While this method avoids the need for an adhesive-backed overlay and has other notable advantages, it also requires the use of an expandable mold. Furthermore, the method described in this application is limited to the use of the same materials for both the core and the light extraction structures. However, the use of diverse materials for the core and light extraction elements is frequently desirable, due to the different processing demands on the two components and the different functions that they serve. For example, as noted above, materials which give good fiber properties are not always amenable to micromachining.

Extrusion methods are known which can be used to create articles, including light guides, in a continuous manner using a thermoplastic feed. However, while extrusion processes are well adapted for the melt processing of thermoplastic materials into profiles that have relatively smooth surfaces, they are less suitable for creating articles that have precision features in a direction transverse to the direction of extrusion, such as the light extraction microstructures in a light guide. This is because, in an extrusion process, the extrudate is still molten and soft as it exits the die, and its final form is affected by cooling and pulling. In the case of a light guide, the percent volume change due to shrinkage as the resin cures typically is large in comparison to the dimensions of the microstructures desired for light extraction. Consequently, the precision of the microstructures is compromised, and they do not perform as intended.

Injection molding may be used to create articles having precision features in a continuous manner. In such a process, molten material is injected under high pressure into a mold which is equipped with the features to be imparted to the finished product. Injection molding is advantageous over extrusion in that both surfaces of the product are controlled during cooling or curing of the thermoplastic material, thereby permitting better control over shrinkage.

Injection molding has been used in various situations in the optical fiber art. Thus, U.S. Pat. No. 4,410,561 (Hart, Jr.) describes the use of injection molding to recoat portions of an optical fiber from which the original coating has been removed during a splicing operation. Japanese Application No. 56123669 (Minoru) makes a somewhat similar disclosure. Other examples of the use of injection molding in this area are described in U.S. Pat. No. 4,531,702 (Plummer), U.S. Pat. No. 5,587,116 (Johnson et al.), U.S. Pat. No. 5,772,932 (Kamiguchi et al.), Japanese Application No. 07296044 (Yasuhiro et al.), Japanese Application No. 06276461 (Yoshiyuki et al.), Japanese Application No.

07006184 (Toshio et al.), Japanese Application No. 06078489 (Takanobu), and Japanese Application No. 06246042 (Tatsuo et al.).

However, injection molding has other limitations that have prevented its use in making optical fibers having precision microstructures thereon. In particular, injection molding requires that the thermoplastic melt be made to take the shape of the mold, and then be allowed to cool. However, the visibly clear, unfilled thermoplastics typically used for optical fibers are poor heat conductors and are subject to significant shrinkage. Therefore, in order to obtain the desired precision while also allowing a sufficiently fast cycle time (usually required to be 60 seconds or less), commercial injection molding of such materials is typically limited to parts having a thickness of less than about ¼ inch (about 6 mm). The large core optical fibers typically used for illumination purposes are well in excess of these dimensions.

There is thus a need in the art for a continuous process for making large core optical fibers and other light guides which have precision microstructures (e.g., light extractors) on the surface thereof. In particular, there is a need in the art for a continuous process for making light guides which allows for the use of diverse materials for the core and light extraction elements, which avoids the additional interfaces necessitated by the use of adhesive-backed overlay films, which overcomes the difficulties of conventional molding processes (e.g., the adverse effects of shrinkage on precision elements), and which does not require the light extraction structures to be machined into the optical core of the light guide. These and other needs are met by the present invention, as hereinafter described.

SUMMARY OF THE INVENTION

In one aspect, the present invention relates to a method for imparting a light extraction surface to a light guide without the need for an adhesive-backed overlay film. In accordance with the method, a light extraction overlay is molded directly onto a light guide by positioning the light guide into an open mold. The mold is provided with microstructured features on its surface that inversely match the desired extraction structures. A curable material, which may be different from the core material but which is preferable capable of bonding strongly to the core material, is placed into the mold, either before, during, or after the light guide is positioned therein. Upon- hardening, the curable material bonds strongly to the light guide while forming the desired microstructures thereon. The microreplicated light guide so formed can be used advantageously in illumination devices and other light extraction applications.

In one particular embodiment of this method, an illumination device is formed through the use of an open mold having a reservoir with an inner surface that includes a plurality of microstructured features thereon. The reservoir of the mold is then filled with a curable material, such as an acrylate, silicone, or urethane, that forms a substantially optically transparent material when it is cured. A prefabricated light guide is positioned in the reservoir, either before, during, or after the curable material is added. The curable material may be selected so that the difference in index of refraction between it and the prefabricated light guide is less than some threshold amount over the wavelength range of interest, e.g., less than about 0.05. The curable material is then allowed to cure so that a bonded layer is formed on the prefabricated light guide. Upon removal from the mold, the bonded layer on the illumination device includes a replica of the plurality of the microstructured features located on the inner surface of the mold.

In a related aspect of the present invention, a molding step of the type described above is part of a continuous process for forming a light guide or illumination device with light extraction structures disposed thereon or therein. In accordance with this aspect of the invention, the light guide is formed in one step of the continuous process, and then positioned in the reservoir in another step of the process.

In yet another aspect of the present invention, a system is provided for fabricating an illumination device, which device includes a light guide with a plurality of light extraction structures formed thereon. The system includes, for example, an extruder to form the light guide, a mold handling device, and an open mold which contacts the light guide. The mold is equipped with a surface having a cross sectional shape that matches the desired overlay cross sectional shape on the light guide. At least one microstructure is formed on the inner surface of the mold having a shape that is a replica (preferably, a negative replica) of a desired light extraction structure. The open mold includes a reservoir of sufficient volume to provide contact between the light guide and a portion of curable material. The curable material is preferably added to the reservoir in such a way that it completely submerges the microstructure.

In still another aspect of the present invention, a system is provided for continuously fabricating a light guide having light extraction structures formed thereon. The system, which may include a forming means for forming the light guide, is equipped with an endless segmented mold formed by multiple open mold segments that are coupled together. Each of the open mold segments rotates about an axis perpendicular to the length of the light guide, and contacts the light guide after the light guide exits the forming means during a portion of the rotation. Furthermore, each of the open mold segments includes an inner surface having a cross sectional shape that matches a desired overlay cross sectional shape on the light guide, which overlay contains the desired light extraction structures. At least one microstructure having a shape that is a replica of a desired light extraction structure is formed on the inner surface. The mold includes a reservoir of sufficient volume to admit the light guide and a portion of curable material. The curable material is added to the reservoir in such a way that it completely submerges the microstructure. The system also includes a container of curable material that is fluidically coupled to a reservoir of each of the open mold segments when the open mold segment contacts the light guide.

In yet another aspect of the present invention, a system for continuously fabricating illumination devices is provided which includes a means of forming a light guide and a moveable endless segmented mold assembly, which assembly includes multiple open mold segments coupled together. Each of the open mold segments rotates about an axis perpendicular to the length of the light guide, and contacts the light guide after the light guide exits the light guide forming means during a portion of the rotation. Furthermore, each of the open mold segments includes a reservoir and an inner surface having a cross sectional shape that matches a desired overlay cross sectional shape (including the desired light extraction structures) on the light guide. The inner surface is further provided with at least one microstructure disposed thereon that has a shape that is a replica of a desired light extraction structure formed on the inner surface. The reservoir has a volume sufficient to provide contact between the light guide and a portion of curable material. The curable material is preferably added to the reservoir in such a way that it completely submerges the microstructure. The system also includes a container of curable material that is fluidically coupled to a reservoir of one of the open mold segments when the one of the open mold segments contacts the light guide.

In still another aspect of the present invention, a method is provided for continuously fabricating an illumination device that includes a plurality of light extraction microstructures. The method comprises the steps of: (a) forming a light guide such as a light fiber; (b) passing the light guide through a moving open mold, which mold includes a plurality of open mold segments having at least one microstructured feature in each of the open mold segments coupled together to form an endless segmented mold assembly; (c) moving the endless segmented mold assembly about an axis perpendicular to the length of the light guide; (d) contacting the light guide with the moving open mold as the light guide is formed during a portion of the rotation of the endless segmented mold assembly; (e) filling each open mold segment with a curable material as the open mold segment contacts the light guide; and (f) at least partially curing the curable material while the open mold segment remains in contact with the light guide.

In the various embodiments and aspects of the present invention described above, the mold may be configured as a continuous structure having a peripheral surface in which the reservoir is located. Also, the step of filling the reservoir with curable material may include continuously replenishing a portion of the reservoir in contact with the light guide with curable material, and the step of curing may include heating or irradiation to effect curing by free-radical methods, condensation methods, or combinations thereof.

In a further aspect, the present invention relates to a novel light guide construction, and to the use of this construction in making an illumination device. The novel light guide has a generally circular cross-section which is flattened in one or more areas. The flattened areas are preferably constructed in such a way that they are capable of being filled in to result in a light guide having an essentially circular cross-section (e.g., the light guide may be D-shaped in cross-section). Light guides of this type can be used advantageously to produce illumination devices by disposing a light extracting material or overlay (with or without microstructures) onto one or more of the flat sections. In a preferred embodiment, the light guide and light extracting material, taken together, have a cross-sectional shape that is generally circular.

The novel light guide construction of the present invention can be used in numerous processes, such as coextrusion, in which a light extracting material or overlay is to be placed on one surface of the light guide. However, this construction is particularly suitable for processes in which it is desirable to injection mold the light extracting material or overlay onto the light guide. In such processes, a light guide having the novel construction can be placed in a closed mold such that the flattened surface of the light guide is adjacent to a reservoir in the mold. If the surface of the reservoir comprises microstructures and the reservoir is filled with a suitable curable resin, an illumination device will be formed which has a surface provided with the negative of the microstructures. If the reservoir is sufficiently small compared to the dimensions of the prefabricated light guide, the curable resin can be injected into the reservoir as part of an injection molding process, without significant loss of microstructural detail due to contraction of the resin during curing.

By separating the manufacture of the light guide into a first step in which the prefabricated light guide is manufactured and a second step in which the light extraction microstructures are added thereto, the present invention provides a continuous manufacturing process for obtaining a light guide having precision microstructures thereon. In particular, the novel light guide construction can be manufactured in a fast, continuous extrusion process which is optimized for making relatively thick components. The material meant for the extraction elements can then be injection molded onto the one or more flat sections of the prefabricated light guide by an injection molding process optimized for making precision features, thereby resulting in a light guide whose overall shape is circular in cross-section. Since the layer required for the extraction material can be relatively thin, the molding step may be achieved with commercially practical cycle times.

Moreover, the process which makes use of the novel light guide structure allows for the use of diverse materials for the core and light extracting elements, thereby allowing the use of materials that are optimized for each function. The selection of materials is further widened by the fact that the processes for making the core and extraction structures can be decoupled, thereby allowing the use, for example, of materials in the extraction structures that are not stable to the processing conditions (e.g., extrusion temperatures) encountered during the manufacture of the core.

BRIEF DESCRIPTION OF THE DRAWINGS

FIG. 1(a) is a schematic, cross-sectional view of a light guide illustrating the operation of the light extraction structures in accordance with the principles of the present invention;

FIG. 1(b) is a schematic, perspective view of one embodiment of the light guide shown in FIG. 1(a);

FIG. 1(c) is a schematic top view of an alternative embodiment of the illumination device of the invention.

FIG. 2(a) is a cross-sectional view of an open mold for fabricating light extraction structures onto a prefabricated optical fiber core in accordance with the present invention;

FIG. 2(b) is a cross-sectional view of an alternative embodiment of the open mold shown in FIG. 2(a);

FIG. 3(a) shows the open mold of FIG. 2 filled with a curable material and

FIG. 3(b) shows the open mold with the prefabricated fiber core inserted therein;

DETAILED DESCRIPTION

Figure 4A:
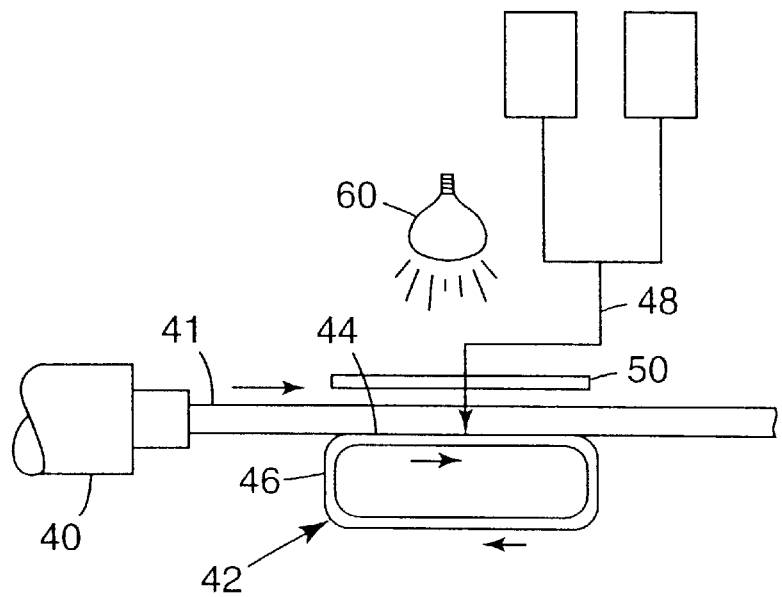
FIG. 4a is a schematic drawing of an apparatus which is equipped with a segmented microstructured tool and which is employed to manufacture an illumination device in a continuous manner in accordance with the present invention.

The present invention pertains to a method and apparatus for imparting light extraction structures to a prefabricated light guide, thereby producing an illumination device. In accordance with the invention, an open mold is utilized to mold the extraction structures and bond them onto the prefabricated light guide. The use of open mold microreplication to impart extraction structures onto a light guide is advantageous in that it avoids the need for directly machining the extraction structures into the light guide, while also allowing the extraction structures to be molded onto a light guide in a continuous manner. The molding step may be performed as a stand-alone process, or may be incorporated into a continuous manufacturing process for the light guide itself Furthermore, the prefabricated light guide from which the illumination device is formed may be any optical waveguide, including, but not limited to, light fibers and planar waveguides used in displays.

A. Illumination Device

FIG. 1(a) depicts a side view of a portion of an illumination device constructed in accordance with the present invention. The illumination device is formed from a light guide 30 having an overlay 12 thereon, overlay 12 having a surface 16 that includes one or more light extraction structures 18 formed therein. Each extraction structure includes at least one optically smooth surface 20. In use, light ray 40 strikes a substantially planar portion 24 of surface 16, where it is reflected back into the light guide at an angle greater than the critical angle of the light guide, and accordingly, continues to propagate along the fiber. By contrast, light ray 42 strikes an optically smooth surface 20 of light extraction structure 18, which reflects light ray 42 into light guide 30 at an angle which is less than the critical angle necessary for continued propagation along light guide 30. Consequently, light ray 42 is transmitted through surface 32 of light guide 30 at a position opposed to the location of extraction structures 18. In one exemplary embodiment of the present invention, optically smooth surface 20 can be coated with a specularly reflective material to enhance the reflection of light from surface 20. Preferable, a cladding layer (not shown) having an index of refraction less than that of overlay 12 covers overlay 12 prior to coating optically smooth surface 20 with a specularly reflective material. Such specularly reflective materials may include highly reflective metals, such as aluminum or silver, or multilayer optical films of the type described in U.S. Ser. No. 08/402,041 (Jonza et al.).

It should be noted that the configuration of extraction structures 18 depicted in FIG. 1(a) is shown for illustrative purposes only. More generally, the extraction structures may have any configuration that causes the extraction of light from the light guide, e.g., by reflecting light rays at an angle less than the critical angle so that the light is emitted or specularly affected from the illumination device. Thus, for example, extraction structures may even comprise randomly dimensioned protrusions or pits 15 that extract light in a diff-use manner, as shown in FIG. 1(c). In some applications, it may be advantageous to use the extraction structures in combination with one or more reflectors.

Light extraction structures 18 may be arranged along light guide 30 in any desired pattern, including, but not limited to, uniform, periodic or random patterns. For example, FIG. 1(b) shows a (perspective) view of an embodiment of the illumination device in which two rows of light extraction structures 18 are employed. The rows extend along the longitudinal axis of light guide 30 and are offset from one another by a prescribed amount. Of course, the size and spacing of the light extraction structures need not be uniform. For example, in some embodiments of the present invention, it may be advantageous to vary the cross-sectional area of light extraction structures 18 per unit length of light guide 30. The cross-sectional area per unit length can be changed by changing, for example, the depth, angle, or orientation of the extraction structures, or the distance between them.

B. Molding Apparatus

The present invention includes an open mold for microreplicating extraction structures onto a prefabricated fiber core. An example of an open mold that may be employed in accordance with the present invention is shown in cross-section in FIG. 2a. Mold 6 comprises reservoir 10 for retaining the molding material. Reservoir 10 is defined by inner surface 13 of the mold. Inner surface 13 can be circular, V-shaped, or any other shape that proves advantageous. Reservoir 10 should be large enough to allow introduction of the molding material and the prefabricated fiber core. The cross-sectional shape of reservoir 10 preferably corresponds to the general or average cross-sectional shape of the final article. Inner surface 13 of mold 6 is imparted with at least one microstructured feature 14. Microstructured features 14 may substantially cover inner surface 13 entirely or they may be limited to one or more particular areas of inner surface 13. Generally, microstructured features 14 may be protrusions from inner surface 13 that are negative replicas of the extraction structures to be formed in the extraction overlay.

FIG. 2(b) shows an alternative embodiment of open mold 6 in which a secondary reservoir 22 is formed in reservoir 10. Microstructured features 14 are disposed in secondary reservoir 22. Since reservoir 10 does not contain the microstructured features 14, reservoir 10 may be advantageously configured to allow the prefabricated light guide to fit more securely therein. In addition, open mold 6 shown in FIG. 2(b) requires substantially less molding material than the FIG. 2(a) embodiment because of the reduced dimensions of reservoir 22 in comparison to reservoir 10.

C. Method of Making Molding Apparatus

The open mold is fabricated from a molding master. The master comprises extraction structures to be added to the fiber core. The master must be fabricated with high precision so that the geometry of the resulting extraction structures is adequate to reflect light with the tolerances required in the finished illumination device. In particular, the structures must be formed from extremely smooth surfaces that meet at sharp corners. Such a high precision master can be fabricated from a machinable stock material capable of being separated from the molding material after the molding material has cured. For example, the stock material may comprise a machinable metal or a hard polymer. Suitable metals include copper, and aluminum, and alloys such as brass. Suitable polymers include acrylics, carbonates, and any other polymer that may be micro-machined to obtain an optical surface and which retains its shape after machining.

Micro-machining stock material to form the mold master may be performed by any known technique using, for example, a diamond tool. Typically, micro-machining is performed using a diamond- or carbon-tipped tool. The profile of the tip will be determined by the shape and dimensions of the structures desired in the mold master. Known micro-machining techniques can reproduce surface structures accurately with a precision approaching 0.001 micron.

The mold itself is a negative replica of the master. The material from which the mold is fabricated preferably is a liquid composition that can be solidified during a curing process. The material is preferably one that undergoes low shrinkage during the curing process and is easily removable from the master. The molding material should also be chosen to reduce adherence with the molded article so that the molded article can be readily released from the mold. Suitable curable materials include elastomers such as silicone elastomers.

D. Method of Open Mold Microreplication

The next step in the process is to fill the inside of the mold with a curable material as in FIG. 3(a). Preferably, curable material 35 is in liquid form when introduced into mold 6 so that material 35 flows around microstructured features 14 inside mold 6. Curable material 35 may be any material that can be introduced into the mold and cured at temperatures and/or pressure conditions that do not adversely affect mold 6. Curable material 35 may be curable by heat, radiation, or other known processes. Curable material 35 preferably bonds to the prefabricated light guide and hardens into a substantially optically transparent material that has an index of refraction closely matching the index of refraction of the prefabricated light guide. Preferably, the difference in the refractive index between the curable material 35 and the prefabricated fiber core is kept to a minimum. For example, in some embodiments of the invention it may be satisfactory to maintain a refractive index difference of less than about 0.1. In other embodiments of the invention, however, it may be necessary to maintain the refractive index difference below 0.05, and in some cases even below 0.01. Suitable curable materials include a polymerizable compound or mixtures. Acrylates are a class of curable materials that are preferable for their transparency properties. Urethanes and silicones are also desirable classes of curable materials because their contraction during curing tends to be minimal, although only certain formulations have desirable transparency properties.

After the curable molding material is applied to the open mold, the molded article (i.e., the inventive illumination device) is produced by introducing the prefabricated light guide into an open mold containing a supply of curable molding material and allowing the curable molding material to cure. FIG. 3(b) shows open mold 6 in which prefabricated fiber core 30 has been inserted subsequent to the application of molding material 35. Once the molding material has cured, the article is easily removed from mold 6.

FIG. 4 shows a method of making the illumination device in a continuous fashion. A prefabricated light guide 41 can be supplied from source 40. Source 40 can include fiber manufactured by, e.g., a continuous extrusion device. As the light guide 41 exits source 40 it extends along upper surface 44 of a continuously circulating open mold 42. Continuously circulating open mold 42 has peripheral surface 46 that supports the reservoir shown, e.g., in FIG. 2. The reservoir is defined by an inner surface having microstructured features (not shown) that correspond to the microstructured features shown in FIG. 2. As open mold 42 moves, a new portion of peripheral surface 46 that defines upper surface 44 comes in contact with light guide 41 to present a new portion of the mold reservoir.

Circulating open mold 42 may be configured in a variety of different ways. For example, mold 42 may comprise a concatenation of individual molds (e.g., molds 6 shown in FIG. 2) linked or chained together, possibly disposed on an endless, circulating belt. Alternatively, rather than being a concatenation of individual segments, circulating open mold 42 may have a reservoir formed directly into a circulating belt so that mold 42 is continuous and unsegmented. The mold portion of an unsegmented, continuous mold may have a number of useful configurations. For example, the mold can have an endless pattern that is uniform over its entire length, or that presents a repeating pattern, or that presents a varying or random pattern, in order to impart light extraction structures according to particular needs. Alternatively, the mold can have an endless pattern that is non-uniform, or presents discrete patterns, over its entire length.

Open mold 42 moves at a speed comparable to the rate at which light guide 41 is fed thereto from source 40. Accordingly, the portion of light guide 41 in contact with upper surface 44 of mold 42 is stationary with respect to the mold over the period of time in which light guide 41 and mold 42 remain in contact. Molding material 48 is injected into the portion of the reservoir defined by upper surface 44. Preferably, if mold 42 is continuous and unsegmented, the material is injected in a continuous manner at a continuous rate. In this way the reservoir is replenished as the molding material bonds to the surface of light guide 41. If mold 42 is a concatenation of segments, the material is injected discontinuously so that each individual mold segment is replenished without injecting molding material between segments.

Light guide 41 only needs to remain in contact with upper surface 44 of mold 42 until the molding material has cured to the point that it will retain its shape and adhere to light guide 41 when it is removed from the mold 42. Typically, this may occur during the so-called "B-stage" of the curing process. Complete curing may take place on a take-up roll or in an oven, as known to those of ordinary skill in the art. Alternatively, curing may be completed while light guide 41 is in contract with open mold 42. Energy, such as heat or UV light, may be applied to the molded overlay by means of, e.g., heating element 50 or light source 60. The arrangement shown in FIG. 4 allows the extraction features to be molded onto the prefabricated light guide at any time subsequent to the formation of the light guide, including, for example, immediately following an extrusion process.

Figure 4B:
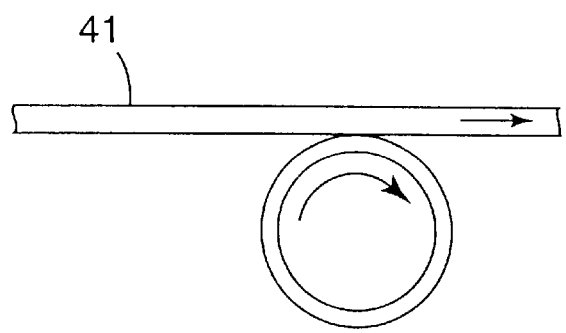
FIG. 4b is a schematic drawing of an apparatus which is equipped with a segmented microstructured tool and which is employed to manufacture an illumination device in a continuous manner in accordance with the present invention.
Figure 5:
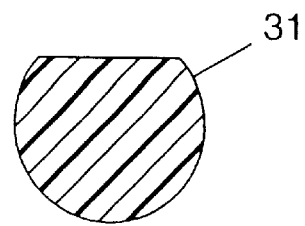
FIG. 5 is a cross-sectional view of a novel light guide useful for making illumination devices in accordance with the present invention.

While the general cross-sectional shape of the continuously moving open mold shown in FIG. 4 is rectangular, it should be emphasized that the mold may have any shape desired. For example, the mold may have a circular cross-sectional shape with a radius of curvature at least sufficiently great to ensure that the upper surface of the mold extends along an adequate portion of the light guide so that the curable material bonds to the light guide, as shown in FIG. 4(b).

E. Light Guide Configurations

The principles of the present invention may be applied to the manufacture of light guides and illumination devices having various shapes and configurations. Such configurations include, for example, rods having round, square, elliptical, or many-sided profiles, and flat sheets or panels. However, a number of new light guide and illumination device constructions have been developed which are especially advantageous when used in the practice of the present invention.

One such light guide construction has a cross-section that resembles a circle which has been flattened in one or more areas (e.g., the light guide is "D-shaped" in cross-section). Prefabricated light guides of this construction can be used advantageously to produce illumination devices by disposing a light extracting material or light extracting microstructures onto one or more of the flat sections, preferably so that the light guide and the light extracting material or structures, taken together, have a cross-sectional shape that is approximately circular. By separating the manufacture of the light guide into a first step in which the prefabricated light guide is manufactured and a second step in which the light extraction material or microstructures are added thereto, the present invention provides a continuous manufacturing process for obtaining a light guide having a light extractor thereon. In particular, the novel light guide construction can be manufactured in a fast, continuous extrusion process which is optimized for making relatively thick components.

The material meant for the extraction elements can then be molded onto the one or more flat sections of the prefabricated light guide by a molding process (e.g., injection molding) which may be optimized, for example, for making precision features, thereby resulting in a light guide whose overall shape is approximately circular in cross-section. Since the layer required for the extraction material can be relatively thin, the molding step may be achieved with commercially practical cycle times.

In another embodiment, the light guide or illumination device of the present invention is provided with first and second opposing flattened surfaces. The first flattened surface has a light extracting material disposed thereon which extracts light (e.g., by reflection) out of the light guide. The other opposing surface is provided with a light modifying means, such as a color filter, polarizer, and/or diffuser. In some embodiments, the other opposing surface may also be provided with a reflector. Light guides can be made in accordance with this embodiment which emanate polarization specific and/or wavelength specific radiation, and the radiation so emanated may be made predominantly specular or diffuse in nature. In the case of light guides which emit polarization-specific radiation, the light guide may further be provided with means (e.g., a polarization randomizer) for converting light of the rejected polarization (i.e., the polarization not extracted) into light of the desired polarization, thereby increasing the output of the desired polarization.

In still another embodiment, the light guide or illumination device is provided with a plurality of flattened surfaces through which light is extracted or caused to be extracted. Thus, for example, the construction of the light guide can be such that the core is essentially polygonal (e.g., triangular, rectangular, square, hexagonal, etc.) or irregular in cross-section or is predominantly circular or elliptical but has one or more flattened surfaces. A sufficient amount of light extracting material and/or cladding may then be disposed on each surface of the core so that the overall construction is essentially circular in cross-section. Thus, for example, the light guide can be an optical fiber with a longitudinal notch along its surface, in which case the space assumed by cladding or light extraction material has a cross-sectional shape in a plane perpendicular to the longitudinal axis of the fiber which is essentially bounded by a triangle or sector. In such an embodiment, it will frequently be advantageous if the notch is relatively narrow (e.g., if the sector subtends an angle of less than about 90°, and more preferably, less than about 45°).

Alternatively, the amount of light extracting material and/or cladding that is added may be such that the overall construction has a desired non-circular shape (e.g., polygonal). A specific, non-limiting example of this later embodiment is an illumination device comprising a light guide which has a trapezoidal cross-section in a plane perpendicular to its longitudinal axis, wherein the amount of light extracting material and/or cladding added to the light guide results in an illumination device that is still approximately trapezoidal in cross-section.

In still other embodiments of this aspect of the present invention, a prefabricated light guide is provided which has one or more notches extending longitudinally along its axis. These notches are then filled with light extracting material and, optionally, one or more of the light modifying means noted above, to produce a finished illumination device that is essentially circular in cross-section.

In several embodiments of the illumination devices made in accordance with the present invention, the cross-sectional shapes of the light guide and the light extracting material combine to form a cross-sectional shape that is essentially circular. Typically, the boundaries of the cross-sectional shapes of the light guide and the light extracting material will be contiguous.

The illumination devices made in accordance with the present invention most preferably comprise optical fibers and other light guides having a high aspect ratio, which ratio is used herein to mean the ratio of the longest dimension to the second longest dimension. Typically, these dimensions are disposed along mutually perpendicular axes. The aspect ratio of the light guides used in making the illumination devices of the present invention will typically be at least 2, more preferably at least 5, and most preferably at least 10.

One light modifying means that is especially useful in the above described embodiments are the continuous/disperse phase materials described in U.S. Pat. No. 5,783,120 (Ouderkirk et al.), U.S. Pat. No. 5,825,543 (Ouderkirk et al.), and U.S. Ser. No. 08/807,268 (Nevitt et al.), all of which are incorporated herein by reference. In one such embodiment, for example, the continuous and disperse phases are both thermoplastic polymers such as PEN/PMMA or PEN/sPS, and are processed such that, in the plane through which light is extracted, there is a relatively large refractive index mismatch between the two phases along a first in-plane axis and a relatively small refractive index difference between the two phases along a second in-plane axis, which second in-plane axis is typically, but not necessarily, orthogonal to the first in-plane axis. For example, the continuous/disperse phase material can be processed such that it behaves as a diffusely reflective polarizer, with the result that the light extracted from the light guide is polarization specific. In some embodiments, the light guide can be configured so that the rejected polarization of light is recycled and made to go through a change in polarization state, thereby increasing the amount of polarization specific light extracted from the light guide. The present invention also contemplates the use of continuous/disperse phase systems in which at least one phase is a liquid crystal. In such an embodiment, for example, the liquid crystal material may be present as droplets which are disposed within a polymeric matrix.

Because they can be made to be diffusely reflective, the continuous/disperse phase materials noted above can be used to perform both a light extraction and a light modifying function. Of course, other light extraction materials known to the art, such as $TiO_2$, can also be used in the present invention.

In the various embodiments of the illumination devices and light guides described above, the flattened or non-circular sections of the light guide may be used in conjunction with, or alternate with, sections of the light guide that have a conventional circular cross-sectional shape or that have some other cross-sectional shape (e.g., the light guide may have a cross-section in a plane perpendicular to its longitudinal axis that alternates between a first shape and a second shape or that varies from a first shape to a second shape). This is especially true in embodiments where it is desired to transport light a given distance before it is extracted. Conversely, the light guide or illumination device may be structured with light extracting structures or materials along most, or all, of its length, in which case the cross-sectional shape of the light guide or illumination device may remain relatively constant.

The description of the invention provided above is merely illustrative, and is not intended to be limiting. Accordingly, one skilled in the art will appreciate that various modifications may be made to the described embodiments, without departing from the scope of the invention. Therefore, the scope of the present invention should be construed solely by reference to the appended claims.

What is claimed is:

1. An open mold for forming an illumination device, comprising:
   a) an inner surface having a cross sectional shape that matches a desired overlay cross sectional shape corresponding to the light guide containing the desired light extraction structures;
   b) at least one microstructure formed on the inner surface thereof and having a shape that is a replica of a desired light extraction structure; and
   c) a reservoir of sufficient volume to allow contact with the light guide and a curable material such that when the curable material is added to the reservoir the curable material completely submerges the microstructure.

2. The open mold according to claim 1, wherein the replica of a desired light extraction structure comprises a negative replica.

3. The open mold according to claim 1, wherein the inner surface has a cross sectional shape approximately matching an outer shape of the light guide, wherein the inner surface further comprises the desired light extraction structures.

4. The open mold of claim 1, wherein said reservoir comprises a primary reservoir and a secondary reservoir, said primary reservoir conforming in shape to the shape of a portion of the light guide and said secondary reservoir containing the inner surface and conforming in shape to the shape of the desired overlay.

5. The open mold of claim 4, wherein the shape of the primary reservoir is a circular segment.

6. In combination with a system for continuously fabricating light extraction structures in a light guide, an endless mold comprising at least one open mold segment forming an endless mold, said mold segment including:
   a) a mold segment having a cross sectional shape that matches a desired overlay cross sectional shape corresponding to the desired light extraction structures;
   b) at least one microstructure formed on the surface thereof and having a shape that is a replica of a desired light extraction structure; and
   c) a reservoir of sufficient volume to allow contact between the light guide and a curable material such that when the curable material is added to the reservoir the curable material completely submerges the microstructure.

7. The combination of claim 6, wherein the replica of a desired light extraction structure comprises a negative replica.

8. The combination of claim 6, wherein the inner surface has a circular cross sectional shape approximately matching a portion of an outer surface of the light guide.

9. The open mold according to claim 8, wherein said light guide is a light fiber.

10. The open mold according to claim 8, wherein said open mold segment is configured as a continuous structure having a continuous peripheral surface in which the reservoir is located.

11. The open mold according to claim 8, further comprising a plurality of open mold segments coupled together to form an endless segmented mold.

12. A system for continuously fabricating an illumination device, comprising:
   a) a source for supplying continuous lengths of light guide;
   b) a movable endless segmented mold assembly including a plurality of open mold segments coupled together to form the endless segmented mold assembly, each of the plurality of open mold segments rotating about an axis that is perpendicular to the length of the light guide, contacting the light guide after the light guide exits the source during a portion of the rotation, wherein each of the plurality of open mold segments includes:
      (i) an inner surface having a cross sectional shape that matches at least a portion of a desired outer surface cross sectional shape of the overlay of the light guide;
      (ii) at least one microstructure having a shape that is a replica of a desired light extraction structure; and
      (iii) a reservoir having a volume sufficient to admit the light guide and a curable material such that when the curable material is added to the reservoir the curable material completely submerges the microstructure; and
   c) a container of curable material fluidically coupled to a reservoir of one of the plurality of open mold segments when the one of the plurality of open mold segments contacts the light guide.

13. The open mold according to claim 12, wherein the replica of a desired light extraction structure comprises a negative replica.

14. The open mold according to claim 12, wherein the inner surface has a cross sectional shape approximately matching an outer shape of the light guide.

15. The open mold according to claim 12, wherein the light guide is a light fiber.

16. An open mold for fabricating an illumination device comprising a light guide having an overlay including a plurality of light extraction structures formed thereon, through which the light guide passes, comprising:
   a) a primary inner surface that has a shape that matches the light guide;
   b) a secondary inner surface having a cross sectional shape that matches a desired overlay cross sectional shape corresponding to the light guide containing the desired light extraction structures;
   c) at least one microstructure formed on the secondary inner surface and having a shape that is a replica of a desired light extraction structure; and
   d) a reservoir of sufficient volume to admit the light guide and a curable material such that when the curable material is added to the reservoir the curable material completely submerges the microstructure.

17. The open mold according to claim 16, wherein the replica of a desired light extraction structure comprises a negative replica.

* * * * *